US010334006B2

(12) United States Patent
Kipp et al.

(10) Patent No.: US 10,334,006 B2
(45) Date of Patent: Jun. 25, 2019

(54) ALIGNING CONTENT PACKAGER INSTANCES

(71) Applicant: Comcast Cable Communications, LLC, Philadelphia, PA (US)

(72) Inventors: Neill Kipp, Centennial, CO (US); Yasser Syed, La Crescenta, CA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 298 days.

(21) Appl. No.: 15/083,733

(22) Filed: Mar. 29, 2016

(65) Prior Publication Data

US 2017/0289223 A1 Oct. 5, 2017

(51) Int. Cl.
*H04L 29/06* (2006.01)
*H04L 12/26* (2006.01)
*H04L 29/08* (2006.01)

(52) U.S. Cl.
CPC ........ *H04L 65/4076* (2013.01); *H04L 43/106* (2013.01); *H04L 65/1063* (2013.01); *H04L 65/607* (2013.01); *H04L 65/80* (2013.01); *H04L 67/02* (2013.01); *H04L 69/24* (2013.01)

(58) Field of Classification Search
USPC ....................................................... 709/219
See application file for complete search history.

(56) References Cited

U.S. PATENT DOCUMENTS

| 8,149,980 | B2 | 4/2012 | Cho et al. |
| 9,819,972 | B1* | 11/2017 | Vantalon .......... H04N 21/23113 |
| 2007/0067707 | A1 | 3/2007 | Travis et al. |
| 2012/0072608 | A1 | 3/2012 | Peters et al. |
| 2012/0254912 | A1* | 10/2012 | Carney .................. G06Q 30/02 725/32 |
| 2013/0064305 | A1 | 3/2013 | Karlsson et al. |
| 2013/0073673 | A1* | 3/2013 | McMahon .......... H04L 67/1097 709/217 |
| 2014/0279852 | A1* | 9/2014 | Chen ................. G06F 17/30023 707/609 |

* cited by examiner

*Primary Examiner* — Vivek Srivastava
*Assistant Examiner* — Hien V Doan
(74) *Attorney, Agent, or Firm* — BakerHostetler

(57) ABSTRACT

Methods and systems for managing content are disclosed. As an example, a plurality of content fragment of a content asset may be generated and a plurality of time stamps may be associated with each of the plurality of fragments. A first time stamp may indicate a time a respective one of the plurality of fragments was generated and a second time stamp may represent an event time associated with one or more events of the network. As such, at least a portion of the plurality of content fragments may be transmitted to each of a plurality of content packagers, wherein at least the second time stamp associated with each of the plurality of fragments facilitates the alignment of the plurality of content packagers with each other.

20 Claims, 7 Drawing Sheets

ALIGNING CONTENT PACKAGER INSTANCES

BACKGROUND

In a streaming media system, a computing device can process requests for one or more data assets such as a sequence of content fragments. The computing device can reference a fragment index or manifest to determine the span of data that constitutes the requested fragment. A user device (e.g., digital media player client) can receive and assemble the requested fragments and can render the fragments to a user.

As an example, devices such as content packagers are used to create the fragments and the fragment manifests based on the media stream. In a content network, multiple content packagers are typically employed. As such, alignment of each of the content packagers relative to the media stream and/or time is necessary to provide a seamless user experience, for example, at the user device. For example, if a content packager fails or communication between a content packager and a user device is interrupted, a redundant content packager must come online to continue the content service for the user device. Thus if alignment is not maintained properly, the packagers may digress in their operation. These and other shortcomings of the prior art are addressed by the present disclosure.

SUMMARY

It is to be understood that both the following summary are exemplary and explanatory only. Methods and systems for managing content are disclosed. One example can comprise generating a plurality of content fragment of a content asset and associating a time stamp with each of the plurality of fragments. The first time stamp may indicate a time that a respective one of the plurality of fragments was generated and a second time stamp may indicate an event time relating to one or more events in the content network. As such, at least a portion of the plurality of content fragments may be transmitted to each of a plurality of content packagers, wherein at least the second time stamp associated with each of the plurality of fragments facilitates the alignment of the plurality of content packagers with each other.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

A content network may be configured to facilitate the transmission of content from a satellite to a transcoder, to a packager, and to a content player. Redundant and geographically distributed components such as multiple packagers may be used to maintain service in the event of an outage. For example, redundant packagers may be aligned (e.g., synchronized) with each other relative to a particular content asset or time, as other tiers of components in the network come online, go offline, and come back online.

In certain aspects, a tagging system may comprise a 64-bit Network Time Protocol (NTP) that rolls over every 136 years and has nanosecond accuracy. As an example, during transcode, each transcoder may mark each content fragment of a content asset (e.g., video asset) with two time stamp values. A first time stamp may be or comprise the NTP time of the creation of the respective content fragment. A second time stamp may be or comprise the NTP time of the last event occurring in the stream, such as a failure of a component in the content network, startup time of the computing device, an advertising marker, and a marker of a region indicating a program or chapter. As described in further detail below, such time stamps may be used to align one or more components (e.g., content packagers) in a content network.

Figure 1:
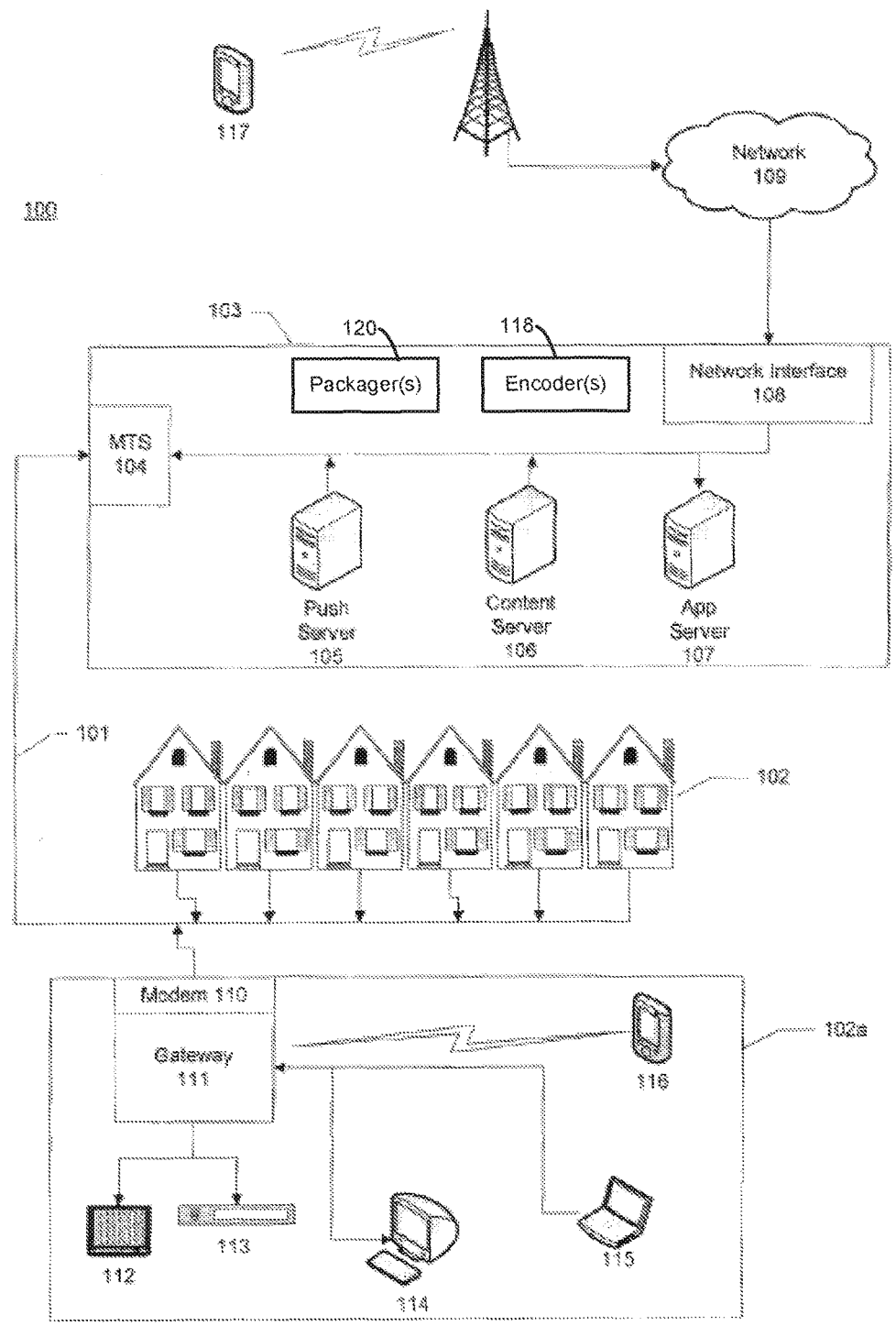
FIG. 1 is a block diagram of an example network.

FIG. 1 illustrates an example content (e.g., data, media, information, services, etc.) delivery network 100 on which many of the various features described herein may be implemented. The network 100 may be any type of information distribution network, such as satellite, telephone, cellular, wired or wireless, etc. One example may be an optical fiber network, a coaxial cable network or a hybrid fiber/coax (HFC) distribution network. Such networks 100 use a series of interconnected communication lines 101 (e.g., coaxial cables, optical fibers, wireless, etc.) to connect multiple premises 102 (e.g., businesses, homes, consumer dwellings, etc.) to a central office 103 (e.g., a headend, a processing facility, etc.). The central office 103 may transmit downstream information signals onto the lines 101, and each premises 102 may have a receiver used to receive and process those signals.

There may be one or more lines 101 originating from the central office 103, and the lines 101 may be split a number of times to distribute the signal to various premises 102 in the vicinity (which may be many miles) of the central office 103. The lines 101 may include components not illustrated, such as splitters, filters, amplifiers, etc. to help convey the signal clearly, but in general each split introduces a bit of signal degradation. Portions of the lines 101 may also be implemented with fiber-optic cable, white other portions may be implemented with coaxial cable, other lines, or wireless communication paths. By running fiber optic cable along some portions, for example, signal degradation in those portions may be significantly minimized, allowing a single central office 103 to reach even farther with its network of lines 101 than before.

The various premises 102 may be connected (through wiring and/or wireless connections) to one another, forming a local premises access network operationally distinct from another local access network. The connected homes forming a local premises access network may be located near one another, such as neighboring townhomes, individual apartments in a downtown highrise, or the like. For example, a local premises access network may include the various premises 102. Another group of homes (now shown) may form a separate local premises access network. The local premises access network of the various premises 102 may be identifiable front the separate local premises access network. A local premises access network may also be associated with a particular geographic region (e.g., city, county, geographic area etc.). In some embodiments, homes connected to a termination system (TS), such as a modem termination system (MTS), may form a local premises access network.

The central office 103 may include a termination system (TS) 104, such as a cable modem termination system (CMTS) in an example of a HFC-type network, which may be a computing device configured to manage communications between devices on the network of lines 101 and backend devices such as servers 105-107 (to be discussed further below). In the example of an HFC-type network, the MIS may be as specified in a standard, such as the Data Over Cable Service Interface Specification (DOCSIS) standard, published by Cable Television Laboratories, Inc. (a.k.a. CableLabs), or it may be a similar or modified device instead. The MIS may be configured to place data on one or more downstream frequencies to be received by modems at the various premises 102, and to receive upstream communications from those modems on one or more upstream frequencies. The central office 103 may also include one or more network interfaces 108, which can permit the central office 103 to communicate with various other external networks 109. These networks 109 may include, for example, Internet Protocol (IP) networks having Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones 117.

As noted above, the central office 103 may include a variety of servers 105-107 that may be configured to perform various functions. For example, the central office 103 may include a push notification server 105. The push notification server 105 may generate push notifications to deliver data and/or commands to the various premises 102 in the network (or more specifically, to the devices in the premises 102 that are configured to detect such notifications). The central office 103 may also include a content server 106. The content server 106 may be one or more computing devices that are configured to provide content to users in the homes. This content may be, for example, video on demand movies, television programs, songs, services, information, text listings, etc. In some embodiments, the content server 106 may include software to validate (or initiate the validation of) user identities and entitlements, locate and retrieve (or initiate the locating and retrieval of) requested content, encrypt the content, and initiate delivery (e.g., streaming, transmitting via a series of content fragments) of the content to the requesting user and/or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream and/or content item being transmitted to the premises 102.

The central office 103 may also include one or more encoders 118 (e.g., transcoders) configured to receive content, process content (e.g., mark time codes, encode information in the stream, fragment/segment the content, etc.). The encoders 118 may be configured to transmit the processed content to one or more content packagers 120, which, in turn may transmit the content to the premises 102. In an aspect, redundant and geographically distributed components such as multiple content packagers 120 may be used to maintain service in the event of an outage. For example, redundant content packagers 120 may be aligned (e.g., synchronized) with each other relative to a particular content asset or time, as other tiers of components in the network come online, go offline, and come back online.

As an example, one or more of the content packagers 120 may be configured to generate a description file (called a "manifest" in the DASH specification ISO 23009-1) containing uniquely identified regions (called "Periods" in the aforementioned specification) and groupings (therein called "AdaptationSet") of a growing list of similar-duration ordered content fragments that populate those regions from a stream of bytes ingested and parsed by the respective content packager 120. As a further example, a set of the content packagers 120 may be connected to one or more encoders 118 using multiple UDP multicast streams. As a further example, events in the content asset (e.g., content stream) identify where the identified regions should change. An event may be the startup time of the transcoder, an advertising opportunity, or the marking of a region indicating a program or chapter.

Figure 5:
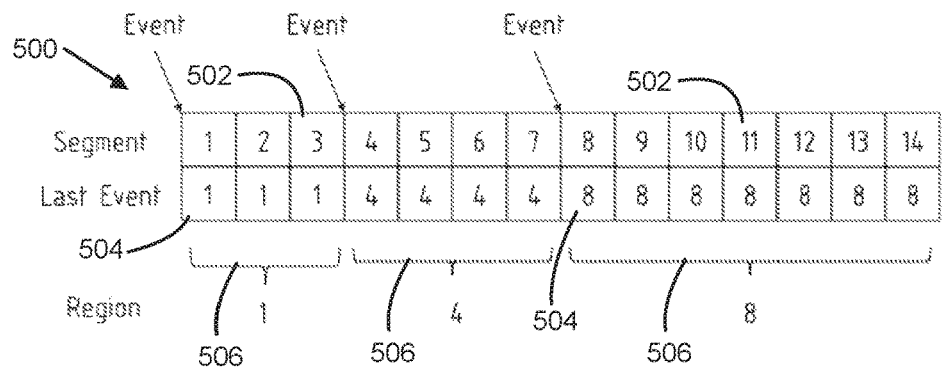
FIG. 5 is a representation of an example data flow.

In another aspect, during a encode or transcode operation, the encoder 118 may mark each content fragment of a content asset (e.g., video asset) with two time stamp values, as illustrated in FIG. 5. A first time stamp may be or comprise the NTP time of the creation of the respective content fragment. A second time stamp may be or comprise the NTP time of the last event occurring in the stream, such as a failure of a component in the content network, startup time of the computing device, an advertising marker, and a marker of a region indicating a program or chapter.

Figure 6:
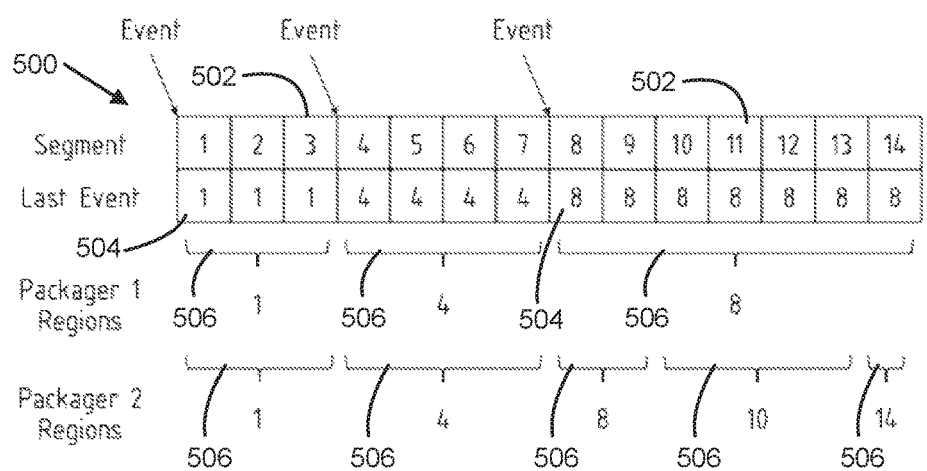
FIG. 6 is a representation of an example data flow.

A set of the content packagers 120 may receive a content fragment and may read the last event time from the second time stamp and may create a region using the last event time as the unique region identifier, as illustrated in FIG. 6. Therefore the set of the content packagers 120 may be configured, using the second time stamp, to generate the same regions (e.g., identified the same way) as each of its redundant packager peers after resuming from a connection failure. Similarly when multiple content packagers 120 join a set, grouping, network or the like, each of the content packagers 120 may read and generate in an aligned manner. As such, there is no need for the content packagers 120 to consult any additional service beyond the transcoder source. If one of the encoders 118 detects an event in the content asset (e.g., stream), the encoder 118 may update the last event time (e.g., the second time stamp) on all successive output content fragments, until the next event. One or more downstream content packagers 120 may receive the updated content fragment having the updated second time stamp, and may generate aligned regions between the content packagers 120. The maximum breadth of the diversion of region identifiers due to signal loss is the maximum duration between events. Meanwhile the segments output from redundant content packagers 120 remain aligned and all regions marked by events are adequately aligned because they are chronologically ordered.

An example premises 102a may include a modem 110 (or another receiver and/or transmitter device suitable for a particular network), which may include transmitters and receivers used to communicate on the lines 101 and with the central office 103. The modem 110 may be, for example, a coaxial cable modem (for coaxial cable lines 101), a fiber interface node (for fiber optic lines 101), or any other desired modem device. The modem 110 may be connected to, or be a part of a gateway interface device 111. The gateway interface device 111 may be a computing device that communicates with the modem 110 to allow one or more other devices in the home to communicate with the central office 103 and other devices beyond the central office. The gateway 111 may be a set-top box (STB), digital video recorder (DVR), computer server, or any other desired computing device. The gateway 111 may also include (not shown) local network interfaces to provide communication signals to other devices in the home (e.g., user devices), such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces may include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
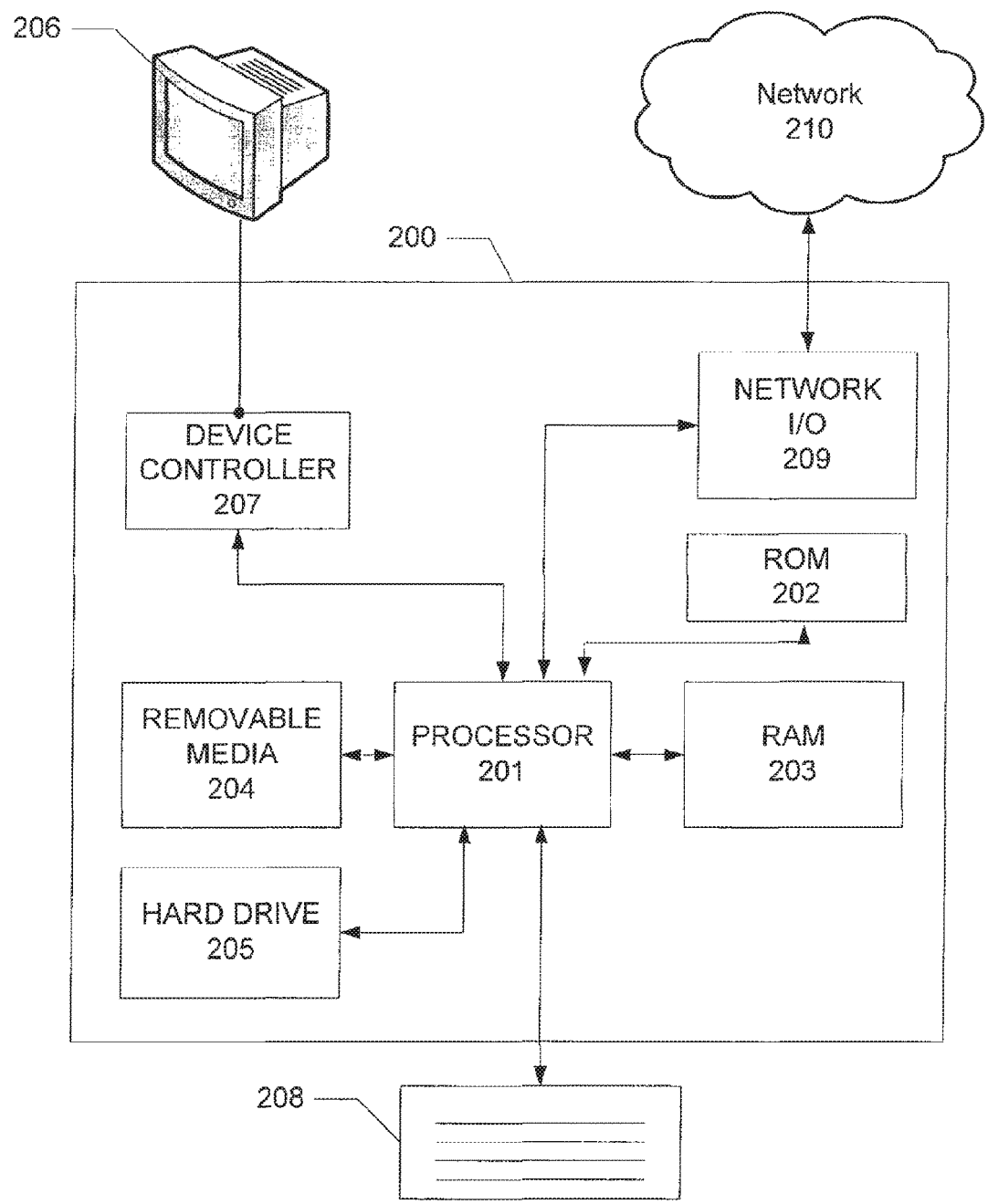
FIG. 2 is a block diagram of an example system architecture.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may he stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor, There may also be one or more user input devices 208, such as a. remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network.

The FIG. 2 example is an example hardware configuration. Modifications may be made to add, remove, combine, divide, etc. components as desired. Additionally, the components illustrated may be implemented using basic computing devices and components, and the same components (e.g., processor 201, storage 202, user interface 205, etc.) may be used to implement any of the other computing devices and components described herein. For example, the various components herein may be implemented using computing devices having components such as a processor executing computer-executable instructions stored on a computer-readable medium, as illustrated in FIG. 2.

One or more aspects of the disclosure may be embodied in a computer-usable data and/or computer-executable. instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may he combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

As discussed above, the central office of an information distribution network may transmit information downstream to various user devices. The transmitted information may include content for consumption (e.g., playback, viewing, listening, display, storage, etc.) by a user via user equipment, such as a gateway interface device gateway interface device 111 of FIG. 1) and/or other computing device (e.g., televisions 112, additional STBs 113, personal computers 114, laptop computers 115, wireless devices 116 of FIG. 1). To assist in providing the content to a user, a content provider may implement in their distribution network an information distribution management system that includes one or more information distribution management devices (e.g., one or more servers and/or other devices) configured to perform various processes related to managing the providing of content to the user equipment (e.g., user device).

For example, such managing may include requesting, creating and handling various sessions (e.g., user sessions, multicast group sessions, cache fill sessions, quality of service sessions); managing transmission of the content (e.g., managing the establishing of transmissions providing unicast content, such as on demand, and linear content, such as multicast content); monitoring usage data of the distribution network, and/or handling requests and notifications from user equipment. As another example, managing may include managing the content discovery, content locating and content delivery processes of the distribution network. In some embodiments, the managing may be implemented using IP (Internet Protocol) and/or Firm (Hypertext Transfer Protocol) based processes. For example, communication between various devices may be performed using HTTP and/or IP packets. In one example, a session manager server may locate a streaming server and/or a multicast address for a particular content item, and may notify user equipment of the streaming server and/or multicast address for the particular content item using HTTP packets. The user equipment may receive the particular content item (via a unicast signal and/or a multicast signal) by receiving HTTP packets that include fragments of the content item and metadata identifying the streaming server and/or multicast address. In some embodiments, communication between devices may use only a single protocol (e.g., only HTTP packets or IP packets). Content items may also be transmitted using the single protocol (e.g., HTTP or IP packets including fragments of content items), Details of these processes, and others, will be discussed in further detail below.

Content discovery processes may include supporting the discovery of content the various content items being provided by a distribution network. For example, content discovery processes may support the discovery of content items for multicast and/or linear transmission. In some embodiments, content discovery and the various related processes may use an HTTP-based approach (e.g., communication is via HTTP and/or IP packets) that includes communication between user equipment, application servers, and other various servers of the central office.

A content locating processes may include supporting the setup of various sessions and managing the resources of the information distribution network. In some embodiments, content locating processes may enforce entitlement procedures and digital rights management (DRM) licenses. Additionally, in some embodiments, content locating and the various related processes may use an IMP based approach that includes communication between user equipment, session manager servers, and other servers of the central office.

Content delivery processes may include supporting the streaming of the content items from various servers, such as a streaming server of the central office. in some embodiments, content delivery processes may enable user equipment to receive multicast signals (e.g., signals directed at a plurality and/or group of user equipment) and/or receive unicast signals (e.g., signals directed at a specific user device). Additionally, in some embodiments, content streaming and the various related processes may use an HTTP based approach that includes communication between user equipment, content servers, and other servers of the central office.

Figure 3:
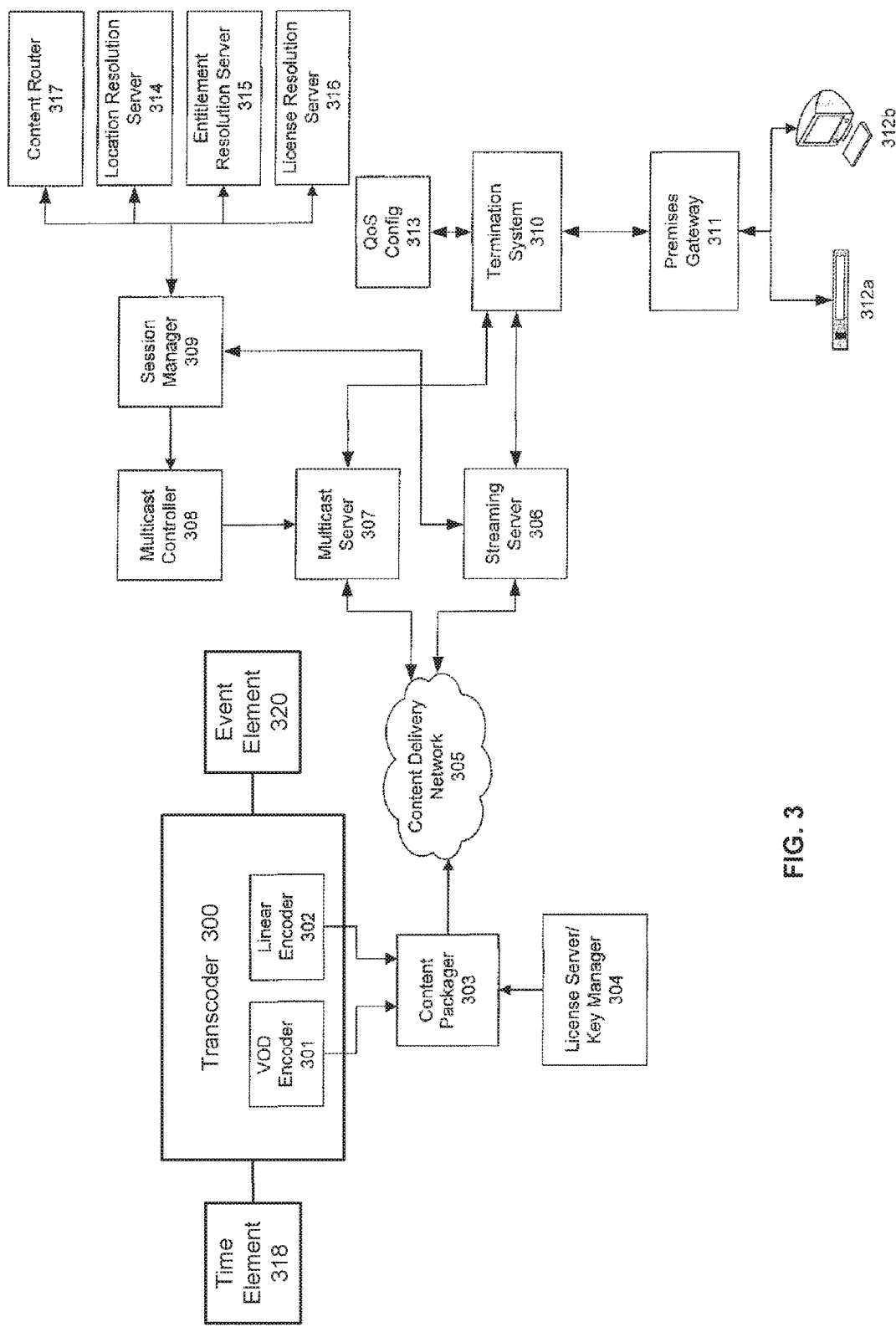
FIG. 3 is a block diagram of an example system architecture.

FIG. 3 illustrates an example system of components that may be implemented on the network 100, and which may be used to implement various features described herein to supply various content to users. The system may include one or more sources of the content. For example, in the case of audio or video content, a transcoder 300 may be included in the network 100. A plurality of the transcoders 300 may be included. In another aspect, the transcoder 300 may associated (e.g., mark) each content fragment of a content asset (e.g., video asset) with at least two time stamp values, as illustrated in FIG. 5. A first time stamp may be or comprise the NTP time of the creation of the respective content fragment. A second time stamp may be or comprise the NTP time of the last event occurring in the stream, such as a failure of a component in the content network, startup time of the computing device, an advertising marker, and a marker of a region indicating a program or chapter.

A time element 318 may be in communication with the transcoder 300 and may be configured to provide a timing reference for the creation of one or more time stamps. As an example, the time element 318 may be or include a synchronized time component such as a computing device configured under the NTP to provide a timing reference that is synchronized over multiple computing devise on a network. Other timing devices may be used.

An event element 320 may be in communication with the transcoder 300 and may be configured to determine an event condition. For example, the event element 320 may include hardware and/or software configured to monitor operations of one or more components in a network (e.g., network 100) and to determine whether an event has occurred on the network such as a failure of a component (e.g., packager 303), a start-up of a component, a shutdown of a component, an outage, transmission/reception issue, and the like. As a further example, the event element 320 may be configured to monitor communications such as a content stream received by the transcoder 300 to determine events such as an advertising marker, a marker of a region indicating a program or chapter, and the like. The event element 320 may be configured to associate a time with the event occurrence and/or detection. Such time reference may be integral with the event element 320 or may be received from an external time source such as the time element 318.

The transcoder 300 may be or may comprise one or more video on demand (VOD) content encoders 301, each of which may include an application server (such as application server 107) configured to store video content such as movies, television shows, video clips, musical videos, etc. The encoders 301 may include encoding hardware and/or software to provide content in a desired format, such as MPEG.

The transcoder 300 may be or may comprise one or more linear content encoders 302. The linear content encoders 302 may be similar to the VOD content encoders 301, but may further be configured to supply content according to a predetermined schedule, as opposed to on demand. For example, the NBC content service may have one or more linear encoders 302 configured to supply a video stream of NBC scheduled video programming (e.g., the nightly news) at the appropriate time.

The system may include one or more content packagers 303. In an embodiment, one or more of the content packagers 303 may be included in the premises gateway 311. One or more of the content packagers 303 may be an application server configured to receive content and package it for delivery to users/user devices. This packaging may include, for example, reformatting the content (e.g., video resolution conversion, coder/decoder conversion, audio conversion, compression altering, synchronization, etc.), and segmenting the content (e.g., a two-hour movie may be divided into a plurality of discrete time segments for delivery). In addition, packaging may include encrypting the content.

Figure 4:
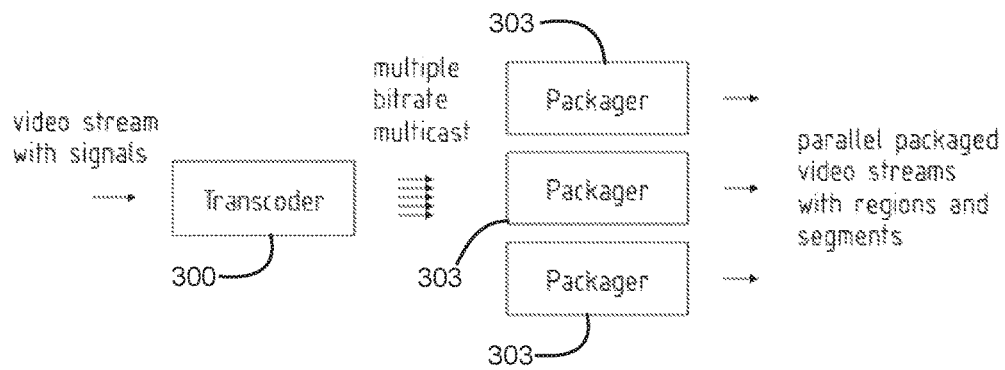
FIG. 4 is a representation of an example data flow.

As shown in FIG. 4, redundant and geographically distributed components such as multiple content packagers 303 may be used to maintain service in the event of an outage. For example, one or more redundant content packagers 303 may be aligned (e.g., synchronized) with each other relative to a particular content asset or time, as other tiers of components in the network come online, go offline, and come back online. Each of the content packagers 303 may be connected to the transcoder 300 using multiple UDP multicast streams or other communication protocols.

Returning to FIG. 3, the system may include a license server/key manager 304, which may be a server configured to manage content entitlement. For example, the manager 304 may contain encryption and/or decryption keys, and can supply those keys to content packager 303 for use in encrypting content for delivery. The manager 304 may also store information identifying users, and the level(s) of service to which the users are entitled, and may make determinations as to whether a particular user is actually entitled to receive a piece of requested content.

A content network 305 may be any desired type of communication network, such as network 109. The content network 305 may span a large geographic area, and may be used to disseminate content or make content accessible. For example, some content may be supplied to a streaming server 306. The streaming server 306 may be a server configured to receive packaged content, and generate a unicast stream of that content for delivery to a user.

Another example may be a multicast server 307. Like the streaming server, the multicast server 307 may also be configured to generate a stream of packaged content. However, the multicast server's stream may be a multicast stream, configured to be received by a plurality of recipient users.

The multicast server 307 may operate at the direction of a multicast controller 308, which may in turn communicate with a session manager 309 to establish multicast sessions for the delivery of various pieces of content. The session manager 309 may be configured to manage one or more sessions of the distribution network by interfacing with various devices in the distribution network and communicating session information with the various devices. In some embodiments, the sessions that are managed by the session manager 309 may include a user session, a multicast group session, a cache fill session, and/or a QoS flow session. For example, a user session may be created upon a user device requesting content, and may include information related to the requested content and the entitlements of the user device. A multicast group session may be created upon a user device joining a multicast group of a particular group of user equipment, and may include information related to the multicast group. A cache fill session may be created upon a user device requesting a cache fill of a particular content item being transmitted (e.g., multicast), and may include information related to the user device and the particular content item.

The servers 306/307 may communicate with a termination system 310 (e.g., termination system 104) to ultimately deliver the content to a user's premises, or to a premises gateway 311 that can, in turn, supply content to various pieces of user equipment, such as a set-top box 312a, computer 312b, or any other desired display device or piece of user equipment.

Other servers may be used as part of this delivery as well. For example, a quality of service (QoS) configuration manager 313 may be used to determine quality of service parameters for a given stream. As another example, a location resolution server 314 may contain geographic identification information for the various servers 306/307, termination servers 310, packagers 303, and other components in the system, and may be configured to determine which device(s) are closest geographically to a requesting user device. The location resolution server 314 may be configured to determine location information for a particular user device. For example, in some embodiments, the location resolution server 314 may receive a location request identifying a particular user device, determine geographic information (e.g., latitude and longitude) for the user device, determine whether the user device is on-network or off-network and transmit the information to the session manager 309. A user device being on-net may include user devices connected via termination systems (e.g., the termination system 310) of the content provider. A user device being off-net may include user devices (e.g., user equipment) connected via third party distribution networks that are not under the management or control of the session manager 309 and the multicast controller 308.

An entitlement resolution server 315 may be configured to validate a user device's entitlement to a particular content item. For example, in some embodiments, the entitlement resolution server 315 may receive a validate entitlement request identifying a content item; determine whether a user device has a valid entitlement to the content item, based on user session information, content item information, and location information of the user device; and transmit the information indicating the result of the determination to the session manager 309. The entitlement resolution server 315 may also be configured to validate a user device's license to a particular content item. For example, in some arrangements, the entitlement resolution server 315 may receive a validate license request identifying a content item, determine whether a user device has a valid license to the content item, based on user session information and content item information, and transmit information indicating the result of the determination to a license resolution server 316.

The license resolution server 316 may be configured to distribute licenses and/or distribute decryption and encryption keys. For example, in some embodiments, the license resolution device 316 may distribute encryption keys to the content packager 303 (or to the license server/key manager 304). The license resolution server may also receive a license request from a user device; transmit a request to the entitlement resolution device to validate the license; and upon receiving an indication that the user device has a valid license, and transmit the license and one or more decryption keys to the user device.

The content packager 303 may receive content in a mezzanine or universal file format to be reformatted, encoded, and segmented based on a user's request for content. The mezzanine or universal file format may comprise, for example, a MPEG-2 single program transport stream or a similar transport stream as described in ISO 13818-1. For instance, in an embodiment of the disclosure the content packager 303 may be functionally positioned at the ingress of the content network 305. Positioning the content packager 303 at the ingress of the content network 305 may allow for caching of the output stream of the content packager 303 for fulfilling other user requests for the same content accessed by similar device types. Caching the output of the content packager 303 upstream of the content network 305 may reduce overall load on the content packager 303. In addition, caching the output upstream of the content network 305 may enable the cached content to be available to a larger pool of users that may be geographically distant. For instance, numerous users utilizing a particular smart phone may request a recent episode of a television series for viewing. These users may be geographically widespread as some may be located in Chicago, Ill. while others may be located in Tampa, Fla. The output requested from the first requesting user may be cached so that the next similar device type request from a user may be delivered from cache reducing overall load on the content packager 303.

The content packager 303 may be functionally positioned at the egress of the content network 305. Positioning the content packager 303 at the egress of the content network 305 may allow all content delivered through the content network 305 to be in a mezzanine or universal file format. In addition, a content packager 303 positioned at the egress of the content network 305 may be in close network proximity to the termination system 310 and the premises gateway 311, which may support session based encryption for increased content security.

FIG. 4 illustrates a plurality of redundant content packagers 303 that may be used to maintain service in the event of an outage. For example, one or more redundant content packagers 303 may be aligned (e.g., synchronized) with each other relative to a particular content asset or time, as other tiers of components in the network come online, go offline, and come back online. Each of the content packagers 303 may be connected to the transcoder 300 using multiple UDP multicast streams or other communication protocols. As such, a video stream may be received by the transcoder 300. The transcoder 300 may embed fragments of the video stream with time stamps indicating at least a segment generation time and an event time. The fragments of the video stream may be transmitted to each of the redundant content packagers 303. The content packagers 303 may process the received packets including the time stamps to ensure that they are aligned with each other based at least upon the last event time stamp. Accordingly, if one or more of the content packagers 303 is unable to provide the video stream to an end-user, one of the redundant content packagers 303 may instead transmit the requested video stream to the end-user with minimal disruption to the user experience. Since each of the redundant content packagers is aligned to at least the last event. As an example, the maximum breadth of the diversion between content packagers 303 due to signal loss is the maximum duration between events.

FIGS. 5-6 illustrate an example content stream 500 including first time stamps 502 and second time stamps 504. As an example, during a encode or transcode operation, an encoder may mark each content fragment of the content stream 500 (e.g., video stream, content asset) with at least two time stamps 502, 504. The first time stamp 502 may be or comprise the NTP time of the creation of the respective content fragment. The second time stamp 504 may be or comprise the NTP time of the last event occurring in the stream, such as a failure of a component in the content network, startup time of the computing device, an advertising marker, and a marker of a region indicating a program or chapter. Each time a new event is detected, the content fragments may be marked with an updated second time stamp 504. A series of content fragments having the same value of the second time stamp 504 may be included in a region 506. As such, devices receiving the content fragments can use the time stamps 502, 504 to align themselves with each other such that each aligned device is processing segments within at least the same region 506.

As more clearly illustrated in FIG. 6, a set of the content packagers (e.g., content packagers 303 (FIGS. 3-4)) may receive a content fragment and may read the last event time from the second time stamp 504 and may create a region 506 using the last event time as the unique region identifier. Therefore, the set of the content packagers 303 may be configured, using the second time stamp 504, to generate the same regions 506 (e.g., identified the same way) as each of its redundant packager 303 peers after resuming from a connection failure. Similarly when multiple content packagers 303 join a set, grouping, network or the like, each of the content packagers 303 may read and generate in an aligned manner. As such, there is no need for the content packagers 303 to consult any additional service beyond the transcoder 300. If the transcoder 300 detects an event in the content asset (e.g., stream), the transcoder 300 may update the last event time (e.g., the second time stamp 504) on all successive output content fragments, until the next event. One or more downstream content packagers 303 may receive the updated content fragment having the updated second time stamp 504, and may generate aligned regions 506 between the content packagers 303. The maximum breadth of the diversion of region identifiers due to signal loss is the maximum duration between events. Meanwhile the segments output from redundant content packagers 303 remain aligned and all regions 506 marked by events are adequately aligned because they are chronologically ordered.

Figure 7:
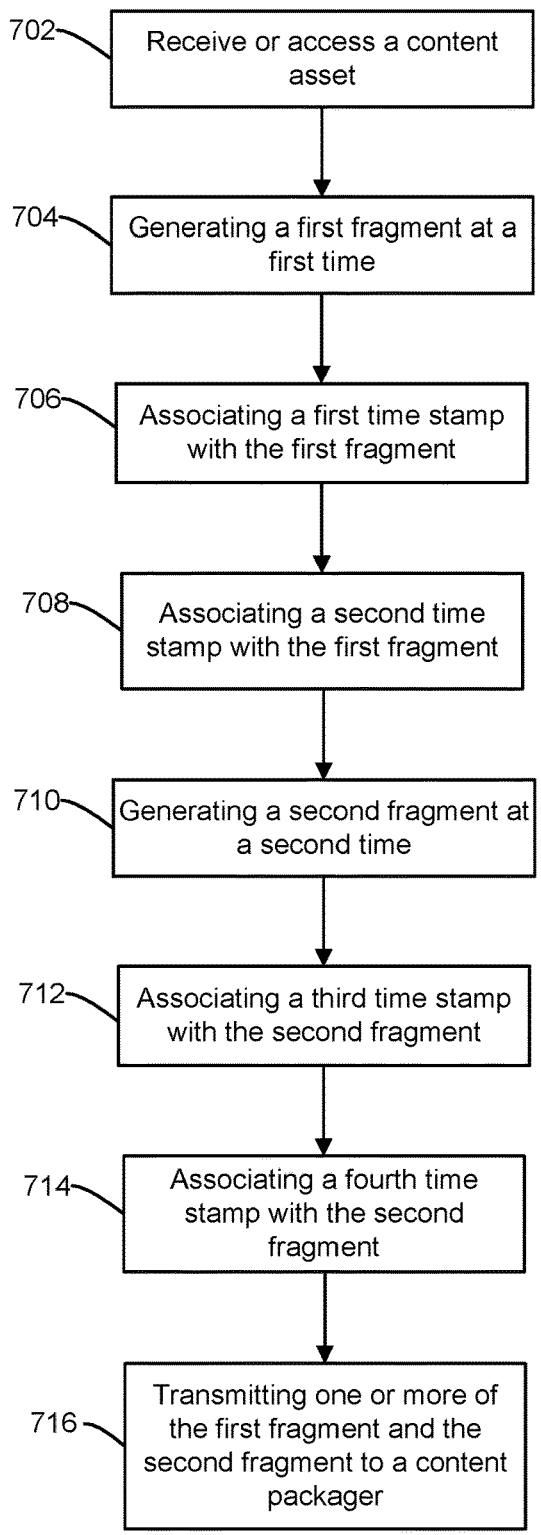
FIG. 7 is a flow diagram of an example method.

FIG. 7 illustrates a flow diagram of a method. In step 702, a content asset may be received or accessed by a computing device in a content network. As an example, the content asset may be a video stream. As another example, the computing device may be a transcoder (e.g., transcoder 300 (FIG. 3)). As such the transcoder may be configured to store video content such as movies, television shows, video clips, musical videos, etc. The transcoder may include encoding hardware and/or software to provide content in a desired format, such as MPEG. The transcoder may further be configured to supply content according to a predetermined schedule or on demand. As a further example, the transcoder may be configured to generate one or more content fragments from the content asset.

In step 704, a first fragment of the content asset may be generated at a first time. As an example, a computing device such as a transcoder may be configured to generate one or more fragments from the content asset. As a further example, the transcoder may include a fragmentor or similar functionality to encode various portions of the content asset into content fragments having a predetermined playback time (e.g., 2 sec, 10 sec, 30 sec, etc.). The content asset may be fragmented into any number of fragments and may have any playback duration.

In step 706, a first time stamp may be associated with the first fragment. The first time stamp may be or comprise the NTP time of the creation of the respective first fragment. As an example, a time element (e.g., time element 318 (FIG. 3)) may be in communication with the transcoder that receives the content asset. As such, the time element may be configured to provide a timing reference for the creation of one or more time stamps. As an example, the time element may be or include a synchronized time component such as a computing device configured under the NTP to provide a timing reference that is synchronized over multiple computing devise on a network. Other timing devices and/or protocols may be used.

In step 708, a second time stamp may be associated with the first fragment. The second time stamp may indicate an event time relating to an event in the content network. The event may comprise one or more of a failure of a component in the content network, startup time of the computing device, an advertising marker, and a marker of a region indicating a program or chapter. As an example, an event element (e.g., event element 320 (FIG. 3)) may be in communication with the transcoder that receives the content asset and may be configured to determine an event condition. For example, the event element may include hardware and/or software configured to monitor operations of one or more components in a network (e.g., network 100) and to determine whether an event has occurred on the network such as a failure of a component (e.g., packager 303), a start-up of a component, a shutdown of a component, an outage, transmission/reception issue, and the like. As a further example, the event element 320 may be configured to monitor communications such as a content stream received by the transcoder to determine events such as an advertising marker, a marker of a region indicating a program or chapter, and the like. The event element may be configured to associate a time with the event occurrence and/or detection. Such time reference may be integral with the event element or may be received from an external time source such as the time element.

In step 710, a second fragment of the content asset may be generated at a second time. As an example, a computing device such as a transcoder may be configured to generate one or more fragments from the content asset. As a further example, the transcoder may include a fragmentor or similar functionality to encode various portions of the content asset into content fragments having a predetermined playback time (e.g., 2 sec, 10 sec, 30 sec, etc.). The content asset may be fragmented into any number of fragments and may have any playback duration.

In step 712, a third time stamp may be associated with the second fragment and may indicate the second time. The third time stamp may be or comprise the NTP time of the creation of the respective second fragment. As an example, a time element (e.g., time element 318 (FIG. 3)) may be in communication with the transcoder that receives the content asset. As such, the time element may be configured to provide a timing reference for the creation of one or more time stamps. As an example, the time element may be or include a synchronized time component such as a computing device configured under the NTP to provide a timing reference that is synchronized over multiple computing devise on a network. Other timing devices and/or protocols may be used.

In step 714, a fourth time stamp may be associated with the second fragment and may indicate the event time relating to the event in the content network. The event may comprise one or more of a failure of a component in the content network, startup time of the computing device, an advertising marker, and a marker of a region indicating a program or chapter. As an example, an event element (e.g., event element 320 (FIG. 3)) may be in communication with the transcoder that receives the content asset and may be configured to determine an event condition. For example, the event element may include hardware and/or software configured to monitor operations of one or more components in a network (e.g., network 100) and to determine whether an event has occurred on the network such as a failure of a component (e.g., packager 303), a start-up of a component, a shutdown of a component, an outage, transmission/reception issue, and the like. As a further example, the event element may be configured to monitor communications such as a content stream received by the transcoder to determine events such as an advertising marker, a marker of a region indicating a program or chapter, and the like. The event element may be configured to associate a time with the event occurrence and/or detection. Such time reference may be integral with the event element or may be received from an external time source such as the time element.

In step 716, one or more of the first fragment and the second fragment may be transmitted to a content packager. As an example, one or more of the first fragment and the second fragment may be transmitted to a plurality of redundant content packagers. As another example, the transmitting of the one or more of the first fragment and the second fragment may be via multiple bitrate multicast. One or more of the content packagers may be included in a premises gateway. One or more of the content packagers may be an application server configured to receive content and package it for delivery to users/user devices. This packaging may include, for example, reformatting the content (e.g., video resolution conversion, coder/decoder conversion, audio conversion, compression altering, synchronization, etc.), and segmenting the content (e.g., a two-hour movie may be divided into a plurality of discrete time segments for delivery) into discrete packages for delivery. As an example, such packaging may be based on the segments generated via the transcoder. In addition, packaging may include encrypting the content. The packaged content may be transmitted to a user device for playback. As described in more detail with respect to FIG. 8, the packagers may process the time stamps in the content fragments to facilitate alignment across multiple packagers.

Figure 8:
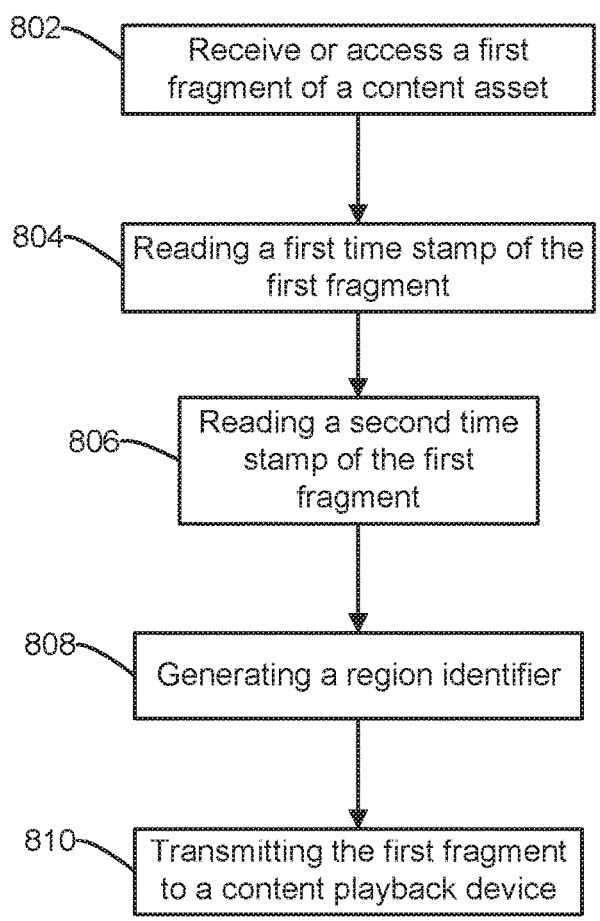
FIG. 8 is a flow diagram of an example method.

FIG. 8 illustrates a flow diagram of a method. In step 802, a first fragment of a content asset may be received (e.g., via multiple bitrate multicast) by a computing device in a content network. As an example the content asset may be a video stream. As a further example, the computing device may be a content packager, such as one of a plurality of redundant packagers. The reception of the first fragment may be via multiple bitrate multicast or other transmission mechanism. The content packager may be included in a premises gateway. The content packager may be an application server configured to receive content and package it for delivery to users/user devices. This packaging may include, for example, reformatting the content (e.g., video resolution conversion, coder/decoder conversion, audio conversion, compression altering, synchronization, etc.), and segmenting the content (e.g., a two-hour movie may be divided into a plurality of discrete time segments for delivery) into discrete packages for delivery. As an example, such packaging may be based on the segments generated via the transcoder. In addition, packaging may include encrypting the content.

In step 804, a first time stamp associated with the first fragment may be read via the computing device. As an example, the first time stamp may indicate a time when the first fragment was generated. The first time stamp may be or comprise the NTP time of the creation of the respective first fragment.

In step 806, a second time stamp associated with the first fragment may be read via the computing device. As an example, the second time stamp may indicate an event time relating to an event in the content network. As a further example, the event may comprise one or more of a failure of a component in the content network, startup time of the computing device, an advertising marker, and a marker of a region indicating a program or chapter.

In step 808, a region identifier may be generated based at least on the second time stamp. For example, on startup, a set of the content packagers may receive a content fragment and may read the last event time from the second time stamp and may create a region using the last event time as the unique region identifier, as illustrated in FIG. 6. Therefore the set of the content packagers may be configured, using the second time stamp, to generate the same regions (e.g., identified the same way) as each of its redundant packager peers after resuming from a connection failure. Similarly when multiple content packagers join a set, grouping, network or the like, they each read and generate as in an aligned manner. As such, there is no need for the content packagers to consult any additional service beyond the transcoder source. If one of the encoders detects an event in the content asset (e.g., stream), the encoder may update the last event time (e.g., the second time stamp) on all successive output content fragments, until the next event. All downstream content packagers may receive the updated content fragment having the updated second time stamp, and may generate aligned regions between the content packagers. The maximum breadth of the diversion of region identifiers due to signal loss is the maximum duration between events. Meanwhile the segments output from redundant content packagers remain aligned and all regions marked by events are adequately aligned because they are chronologically ordered.

In step 810, the first fragment may be transmitted to a content playback device. Because the content packagers are aligned using the time stamps, a failure of one of the content packers may not disrupt the user experience via the content playback device. For example, failure of one content packager may result in a second content packager transmitting the content to the content playback device in place of the failed content packager.

Figure 9:
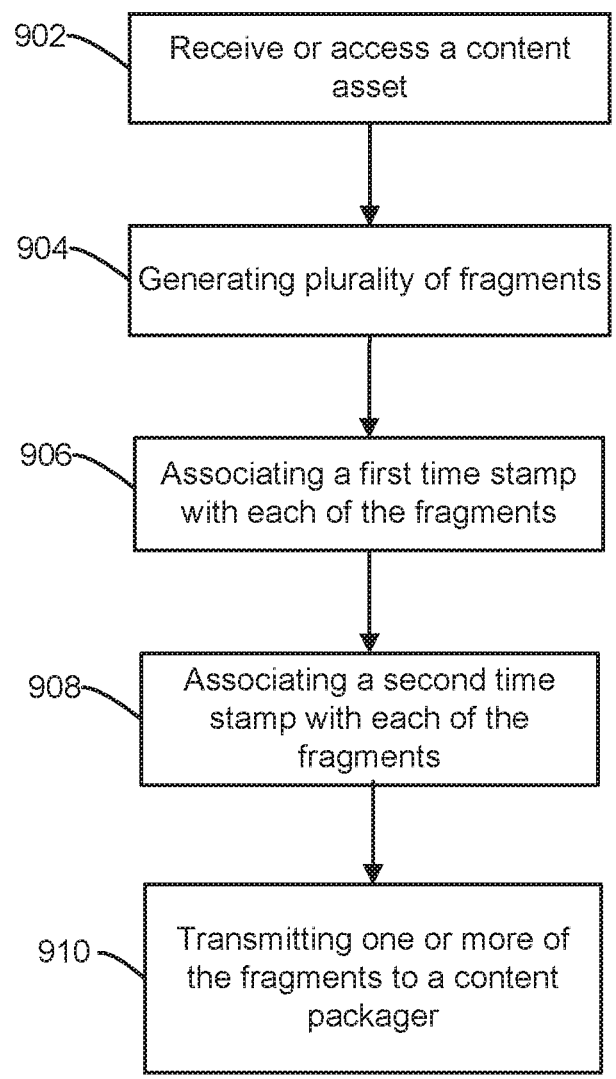
FIG. 9 is a flow diagram of an example method.

FIG. 9 illustrates a flow diagram of a method. In step 902, a content asset may be received or accessed by a computing device in a content network. As an example, the content asset may be a video stream. As another example, the computing device may be a transcoder (e.g., transcoder 300 (FIG. 3)). As such the transcoder may be configured to store video content such as movies, television shows, video clips, musical videos, etc. The transcoder may include encoding hardware and/or software to provide content in a desired format, such as MPEG. The transcoder may further be configured to supply content according to a predetermined schedule or on demand. As a further example, the transcoder may be configured to generate one or more content fragments from the content asset.

In step 904, a plurality of content fragments of the content asset may be generated. As an example, a computing device such as a transcoder may be configured to generate one or more fragments from the content asset. As a further example, the transcoder may include a fragmentor or similar functionality to encode various portions of the content asset into content fragments having a predetermined playback time (e.g., 2 sec, 10 sec, 30 sec, etc.). The content asset may be fragmented into any number of fragments and may have any playback duration.

In step 906, a first time stamp may be associated with each of the plurality of fragments and may indicate a time each of the respective fragments of the plurality of fragments was generated. The first time stamp may be or comprise the NTP time of the creation of the respective fragment. As an example, a time element (e.g., time element 318 (FIG. 3)) may be in communication with the transcoder that receives the content asset. As such, the time element may be configured to provide a timing reference for the creation of one or more time stamps. As an example, the time element may be or include a synchronized time component such as a computing device configured under the NTP to provide a timing reference that is synchronized over multiple computing devise on a network. Other timing devices and/or protocols may be used.

In step 908, a second time stamp may be associated with each of the plurality of fragments and may indicate an event time relating to one or more events in the content network. The event may comprise one or more of a failure of a component in the content network, startup time of the computing device, an advertising marker, and a marker of a region indicating a program or chapter. As an example, an event element (e.g., event element 320 (FIG. 3)) may be in communication with the transcoder that receives the content asset and may be configured to determine an event condition. For example, the event element may include hardware and/or software configured to monitor operations of one or more components in a network (e.g., network 100) and to determine whether an event has occurred on the network such as a failure of a component (e.g., packager 303), a start-up of a component, a shutdown of a component, an outage, transmission/reception issue, and the like. As a further example, the event element 320 may be configured to monitor communications such as a content stream received by the transcoder to determine events such as an advertising marker, a marker of a region indicating a program or chapter, and the like. The event element may be configured to associate a time with the event occurrence and/or detection. Such time reference may be integral with the event element or may be received from an external time source such as the time element.

In step 910, at least a portion of the plurality of content fragments may be transmitted to each of a plurality of content packagers, wherein at least the second time stamp associated with each of the plurality of fragments facilitates the alignment of the plurality of content packagers with each other. One or more of the content packagers may be included in a premises gateway. One or more of the content packagers may be an application server configured to receive content and package it for delivery to users/user devices. This packaging may include, for example, reformatting the content (e.g., video resolution conversion, coder/decoder conversion, audio conversion, compression altering, synchronization, etc.), and segmenting the content (e.g., a two-hour movie may be divided into a plurality of discrete time segments for delivery) into discrete packages for delivery. As an example, such packaging may be based on the fragments/segments generated via the transcoder. In addition, packaging may include encrypting the content. The packaged content may be transmitted to a user device for playback. As described in more detail with respect to FIG. 8, the packagers may process the time stamps in the content fragments to facilitate alignment across multiple packagers.

While the methods and systems have been described in connection with preferred embodiments and specific examples, it is not intended that the scope be limited to the particular embodiments set forth, as the embodiments herein are intended in all respects to be illustrative rather than restrictive.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and comprise the disclosed systems. These and other components are disclosed herein, and it is understood that when combinations, subsets, interactions, groups, etc. of these components are disclosed that while specific reference of each various individual and collective combination and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   receiving, by a computing device, a content asset via a network;
   generating a first fragment of the content asset at a first time, wherein the first fragment comprises a first time stamp indicating the first time and a second time stamp indicating an event time of an event associated with the network or the content asset;
   generating a second fragment of the content asset at a second time, wherein the second fragment comprises a third time stamp indicating the second time and a fourth time stamp indicating the event time; and
   transmitting the first fragment and the second fragment to at least two content packagers, wherein the at least two content packagers are configured to align processing of one or more of the first fragment and the second fragment based at least on the first time stamp, the second time stamp, the third time stamp, and the fourth time stamp.

2. The method of claim 1, wherein the content asset is a video stream.

3. The method of claim 1, wherein the first fragment and the second fragment comprise sequential portions of the content asset.

4. The method of claim 1, wherein the computing device is a transcoder.

5. The method of claim 1, wherein one or more of the first time stamp, the second time stamp, the third time stamp, and the fourth time stamp is a network time protocol time stamp.

6. The method of claim 1, wherein the event comprises one or more of a failure of a component associated with the network, a startup time of the computing device, an advertising marker, a pre-defined marker, and a marker of a region indicating a program or chapter.

7. The method of claim 1, wherein the transmitting the first fragment and the second fragment to the at least two content packagers is via multiple bitrate multicast.

8. The method of claim 1, wherein the at least two content packagers comprise a redundant packager.

9. An apparatus comprising:
   one or more processors; and
   memory storing instructions that, when executed by the one or more processors, cause the apparatus to:
      receive a content asset via a network;
      generate a first fragment of the content asset at a first time, wherein the first fragment comprises a first time stamp indicating the first time and a second time stamp indicating an event time of an event associated with the network or the content asset;

generate a second fragment of the content asset at a second time, wherein the second fragment comprises a third time stamp indicating the second time and a fourth time stamp indicating the event time; and transmit the first fragment and the second fragment to at least two content packagers, wherein the at least two content packagers are configured to align processing of one or more of the first fragment and the second fragment based at least on the first time stamp, the second time stamp, the third time stamp, and the fourth time stamp.

10. The apparatus of claim 9, wherein the first fragment and the second fragment comprise sequential portions of the content asset.

11. The apparatus of claim 9, wherein the apparatus is a transcoder.

12. The apparatus of claim 9, wherein one or more of the first time stamp, the second time stamp, the third time stamp, and the fourth time stamp is a network time protocol time stamp.

13. The apparatus of claim 9, wherein the event comprises one or more of a failure of a component associated with the network, a startup time of the apparatus, an advertising marker, a pre-defined marker, and a marker of a region indicating a program or chapter.

14. The apparatus of claim 9, wherein the transmit of the first fragment and the second fragment to the at least two content packagers is via multiple bitrate multicast.

15. The apparatus of claim 9, wherein the at least two content packagers comprise a redundant packager.

16. A non-transitory computer-readable medium storing instructions that, when executed by one or more processors, cause:

receiving, by a computing device, a content asset via a network;

generating a first fragment of the content asset at a first time, wherein the first fragment comprises a first time stamp indicating the first time and a second time stamp indicating an event time of an event associated with the network or the content asset;

generating a second fragment of the content asset at a second time, wherein the second fragment comprises a third time stamp indicating the second time and a fourth time stamp indicating the event time; and transmitting the first fragment and the second fragment to at least two content packagers, wherein the at least two content packagers are configured to align processing of one or more of the first fragment and the second fragment based at least on the first time stamp, the second time stamp, the third time stamp, and the fourth time stamp.

17. The non-transitory computer-readable medium of claim 16, wherein the content asset is a video stream.

18. The non-transitory computer-readable medium of claim 16, wherein the computing device is a transcoder.

19. The non-transitory computer-readable medium of claim 16, wherein the event comprises one or more of a failure of a component associated with the network, a startup time of the computing device, an advertising marker, a pre-defined maker, and a marker of a region indicating a program or chapter.

20. The non-transitory computer-readable medium of claim 16, wherein the transmitting the first fragment and the second fragment to the at least two content packagers is via multiple bitrate multicast.

* * * * *